4 Sheets--Sheet 1.

P. D. CUMMINGS, M. SMITH & J. C. JORDAN.
Machines for Cutting Matches.

No. 139,457. Patented June 3, 1873.

Witnesses:
John W Stockwell
Frank H. Jordan

Inventors:
Perley D. Cummings.
Manasseh Smith.
James C. Jordan.
Per Atty.
Wm Henry Clifford.

AM. PHOTO-LITHOGRAPHIC CO. N.Y. (OSBORNE'S PROCESS.)

4 Sheets--Sheet 2.

P. D. CUMMINGS, M. SMITH & J. C. JORDAN.
Machines for Cutting Matches.

No. 139,457. Patented June 3, 1873.

Witnesses:
John W. Stockwell
Frank H. Jordan

Inventors
Perley D. Cummings
Manasseh Smith
James C. Jordan
Per Atty
Wm Henry Clifford

AM. PHOTO-LITHOGRAPHIC CO. N.Y. (OSBORNE'S PROCESS)

4 Sheets--Sheet 3.
P. D. CUMMINGS, M. SMITH & J. C. JORDAN.
Machines for Cutting Matches.
No. 139,457. Patented June 3, 1873.
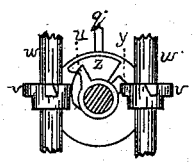
Fig. 5.
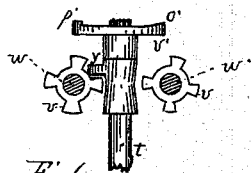
Fig. 6.
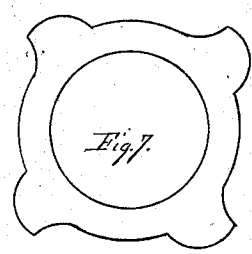
Fig. 7.
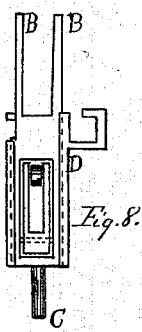
Fig. 8.
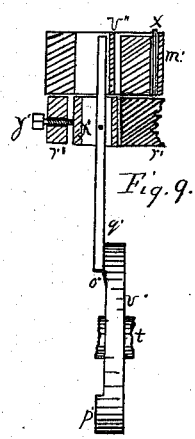
Fig. 9.
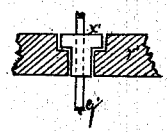
Witnesses:
John W. Stockwell
Frank H. Jordan
Inventors:
Perley D. Cummings
Manasseh Smith
James C. Jordan
Per Atty.
Wm. Henry Clifford 4 Sheets--Sheet 4.

P. D. CUMMINGS, M. SMITH & J. C. JORDAN.
Machines for Cutting Matches.

No. 139,457. Patented June 3, 1873.

Witnesses:
John W. Stockwell
Frank H. Jordan

Inventors.
Perley D. Cummings
Manasseh Smith
James C. Jordan
Per Atty
Wm. Henry Clifford

UNITED STATES PATENT OFFICE.

PERLEY D. CUMMINGS, MANASSEH SMITH, AND JAMES C. JORDAN, OF PORTLAND, MAINE; SAID CUMMINGS ASSIGNOR TO SAID SMITH AND JORDAN.

IMPROVEMENT IN MACHINES FOR CUTTING MATCHES.

Specification forming part of Letters Patent No. 139,457, dated June 3, 1873; application filed March 14, 1873.

*To all whom it may concern:*

Be it known that we, PERLEY D. CUMMINGS, MANASSEH SMITH, and JAMES C. JORDAN, of Portland, in the county of Cumberland and State of Maine, have invented certain new and useful Improvements in Machines for Cutting Matches; and we do hereby declare that the following is a full, clear, and exact description thereof, that will enable others skilled in the art to which it appertains to make and use the same, reference being had to the accompanying drawings and to the letters of reference marked thereon, which form a part of this specification.

Figure 1:
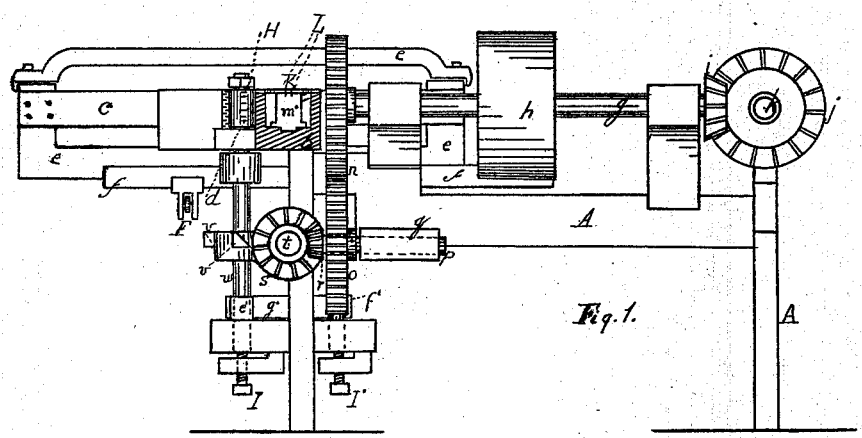
Figure 2:
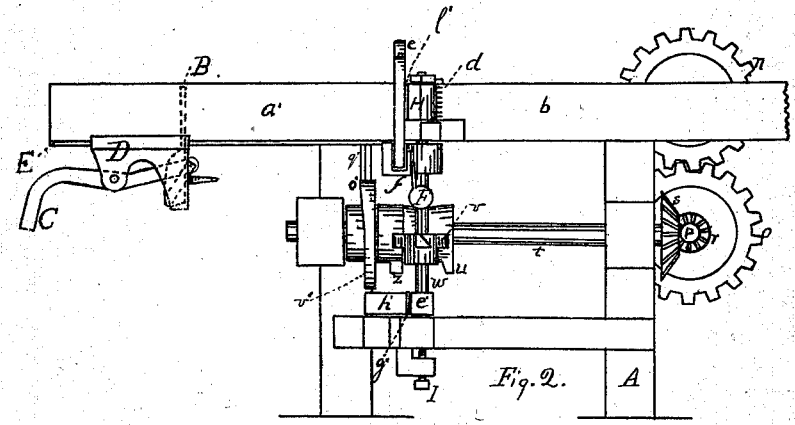
Figure 3:
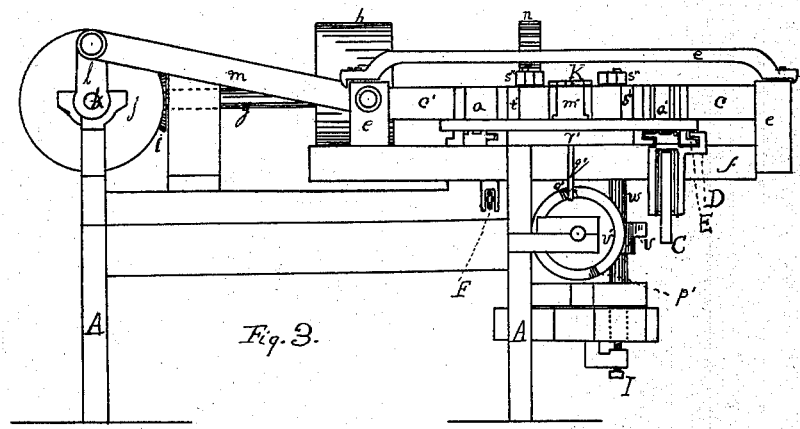
Figure 4:
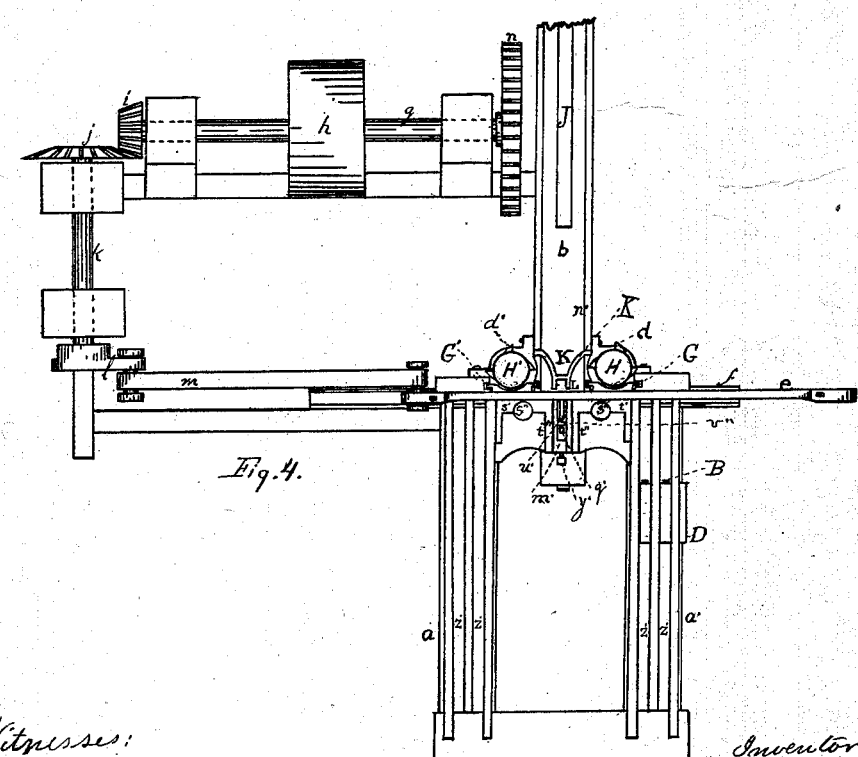
Figure 12:
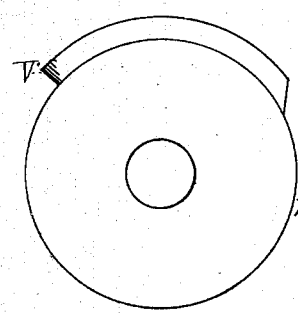
Figure 10:
Figure 11:
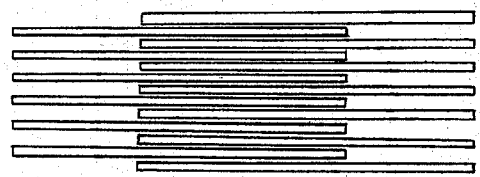

Figure 1 is a front elevation. Fig. 2 is a side elevation. Fig. 3 is a rear end elevation. Fig. 4 is a top plan. Fig. 5 is a detail of the method of operating the cutters. Fig. 6 is another view in detail top plan of the same. Fig. 7 is a full-sized view of one of the cutters. Fig. 8 is an end view of one of the feed carriages and fingers. Fig. 9 is a vertical section of the spring-plunger. Fig. 10 is a view of the notching and slitting-knife. Fig. 11 shows method of packing the cards for the dipping; Fig. 12, a modification of cutting implements.

Same letters show like parts.

Our machine relates to the manufacture of matches, and has for its particular object to produce a combination of devices by which match-cards, either plain or previously notched, can be cut into matches throughout nearly the whole length of the same, leaving only a narrow strip or portion at the butt of the card uncut, which shall be sufficient to hold the splints or matches together in a card until they are broken off for use, and then admit of their being easily and conveniently detached.

Our machine accomplishes this by taking the cards from horizontal hoppers and forcing them in an upright position, or standing on their side edges on to sets of knives by which they are cut into match-cards of the kind described. The knives are of course arranged to enter the points of the notches of the cards. When put into the hopper the cards are so placed that the notches shall first present themselves to the knives as the cards are impelled by the plungers. When the knives have slit the card the desired proportion of its length they then move away from the card, and the card is pushed beyond the knives by the continued movement of the plunger. When the operation of slitting is complete the card is pushed by the movement of the plunger in front of a short spring-plunger, $m'$, and moved horizontally forward in the trough $b$ sufficiently to allow the card next slit from the opposite side to move up behind it and into its place.

As a further general statement of the operation of our machine, we specify that the cards are stacked after being slit so that the points of the cards project alternately in opposite directions—that is, the points of one card are on the same side of the stack as the butts of the two contiguous ones, and the points project beyond the butts a distance sufficient to admit of their being dipped. This is accomplished by the plungers first named and the width of the trough, and will be hereinafter more fully explained:

A shows the machine frame; $a$ $a'$ the hoppers from which the notched cards are fed up to the plungers. $b$ is the trough into which the cards are pushed after being slit. $c$ $c'$ are the plungers that force the cards onto the knives. $d$ $d'$ are the knives. $e$ is the sash or frame which carries the plungers $c$ $c'$, and it travels in the track $f$. $g$ is a shaft having the fast pulley $h$, to which power may be applied. On this shaft is the bevel-gear $i$, matching the gear $j$ set on the shaft $k$, which carries the crank $l$; to this is attached the arm $m$, which is pivoted to the sash $e$. Thus a reciprocating horizontal motion is communicated to the plungers $c$ $c'$. Upon the main shaft $g$ is also set the gear $n$, matching the gear $o$ on the shaft $p$, with bearings at $q$, as illustrated. Rigidly set on the shaft $p$ is also the pinion $r$, matching the bevel-gear $s$ on the shaft $t$. The shaft $t$ has at its opposite end, or at any convenient point, the following devices: The cam $u$. This is to turn the arbors upon which the knives $d$ $d'$ are set so that they shall be in proper position for cutting the cards when the same are forced up to them by the plungers $c\ c^1$. This it does by being revolved against the projections $v$ on the vertical shafts $w\ w^1$, and thus turning the said shafts. The vertical shafts $w\ w^1$ are alternately moved by the cams $u$ to properly place the knives to slit the cards as they are presented first to one and then to the other set of knives by the reciprocating motion of the plungers $c$ $c^1$. The shaft $t$ has also the cam or projection $y$, which is also moved around with the shaft in its rotation. The object of this is so to turn, alternately, the arbors upon which the knives $d\ d'$ are set that they shall move away or out of the card when the cutting or slitting has extended a sufficient part of the length of the card. The shaft $t$ has also the cam $z$, which is also moved around with the rotation of the shaft. This has for its object to hold the vertical shafts $w\ w'$ fixed and motionless while the card is being cut by the knives $d\ d'$. This the cam $z$ performs by bearing against one of the projections $v$ from the vertical shafts which carry the knives $d\ d'$. At the bottom of the vertical shafts $w\ w'$ are seen the rectangular portions $e'\ f'$. Pressing upon these parts of these shafts is or are the horizontal spring or springs $g'$, kept in place by the block $h'$.

When the cam $u$ so turns one of the vertical shafts as to present the slitting-knives in the proper position for cutting the cards, one of the corners of the rectangular portions $e'$ or $f'$ is then left touching said spring. The shaft is held in this position till the card comes against the knives. When the card has been cut the required distance, and the cam $z$ has ceased to hold the vertical shafts, the contact of the knives and the match-card will generally turn the vertical shaft to leave a small portion of the card uncut at the butt in order to hold the matches together. By this means the passage of the match-card, as it is pushed by one of the plungers $c\ c'$, will so turn the knives on the vertical shafts as to accomplish the above result. If this does not take place then the stud or starting-cam $y$, by touching and pushing against the projection $v$, will then turn the vertical shaft, and the horizontal spring $g'$ will quickly move the shaft so that one of the faces of the rectangular parts $e'\ f'$ is brought against the spring, which motion of the vertical shaft, as before described, moves the knives away from the card.

$a\ a'$ show hoppers, in which the cards are placed to be fed to the knives. They are so placed as to be fed to the knives with their points or notches pointing toward the knives. They are kept pressed closely up against the end of the hoppers next to the plungers $c\ c'$. When a plunger is drawn back or out of the farther end of one of the hoppers $a\ a'$ the pressure upon the column of cards in the hoppers $a\ a'$ will push a card up into the thin or narrow space vacated by the plunger in being thus drawn back; and then, when the plunger is moved forward again, its end will strike the butt end of the card and force it along the slot $l'$ through the knives, and in front of the spring-plunger $m'$. When pushed to this position it is carried over to the opposite side of the trough from which it entered the same. If, for example, it was driven in by $c'$ and on that side of the trough, it would rest with its points touching the side $n'$ of the trough. Thus the cards pass by each other a portion of their length—i. e., the points of one project beyond the butts of the two contiguous ones—a distance as great as the trough is wider than a card is long. When thus stacked they are in the position seen at Fig. 11. When thus driven in front of the spring-plunger $m'$ the plunger is allowed to move forward a slight distance in order to pass forward the whole stack in the trough, and to leave immediately in front of the spring-plunger a space sufficient for the next card which is about to be driven into the trough to enter it without disturbing those already in the trough. The manner in which the spring-plunger performs this function should now be described. Upon the shaft $t$ is rigidly set the cam $v'$ having the two elevations $o'\ p'$ on the face thereof. Bearing upon the face of the cam, and upon these two elevations when brought around under its end, is the lever $q'$. This lever extends vertically up through the bed piece $r'$ of the machine, so that it can tip backward and forward in a vertical plane. $s'\ t'$ show two metal pieces secured to the bed $r'$ by the bolts $s''\ s''$. These have the side pieces $t''\ t''$ to form a channel in which the spring-plunger $m'$ moves. The plunger is slotted to receive the spring $u'$. $v''$ is a bar or partition in the plunger for the spring to play against, and $x$ is a stud set into the bed-piece $r'$ for the same purpose. The lever $q'$ is set into a small box in a mortise in the bed-piece $r'$. This box (see $x'$) is set on tracks on each side of the slot, and can thus be pushed forward by the screw $y'$, so as to regulate the movements of the plunger, as may be desired—that is, to make it advance more or less into the trough to push ahead the stack of cards. When the lower end of the lever $q'$ is on one of the two elevations of the cam $v'$ it then pushes forward the whole stack of match-cards in the trough about the distance of the thickness of one card, and thus makes room for the next card driven in by one of the two plungers; and then the lower end of the lever $q'$, passing off from the projection onto the face of the cam, plunger $m'$ is drawn back by the spring, and leaves a clear space for the passage of the next card. The hoppers $a\ a'$ have slots in their bottoms, as shown at $z'$. Up through these project the fingers B. These fingers are attached to the ends of levers C. These levers are pivoted into carriages D having tracks E on which to move backward and forward. By tipping upward the power end of the levers C the fingers H are drawn downward. F are pulleys attached to the frame of the machine. Over these runs a cord with a weight, which cord being attached to the carriages so draws them as to keep the fingers B constantly pressed against the rear end of rows of match-cards placed in the hoppers $a$ $a'$. When a row of cards placed in either of the hoppers has been nearly all forced onto and slit by the knives $d$ $d'$, and thus the supply nearly exhausted from such hopper, and a row of fresh cards has already been placed in the hopper behind the fingers B, then by lifting up the hand-lever C in such hopper the fingers will be drawn down, and the carriage D can be drawn back until the fingers are behind the newly-added row of cards, the fingers are then pushed up through the slots by dropping the lower end of lever C, and will take the new row of cards onward. This it will be seen effects an economy of time, as the slitting can continue while the hoppers are being refilled, and while the carriage D is being drawn back the hand pressed against the rear end of a row of cards will maintain the pressure sufficient for the plungers to take a card at each movement. G G' show slotted plates through which the knives move. The knives are set in the heads H H', which, as before described, are rigidly attached to the tops of the two vertical shafts.

The order and the succession of the motions in our machine are as follows: First, the knives on one vertical shaft are so moved as to penetrate through the slats in the slatted plate G or G'. The plunger on that side of the machine then moves forward and drives a card on to the knives so arranged. The knives cut the card as desired, the head H or H' rotates so as to remove the knives from the card at the desired point, and the card is then further driven in front of the spring-plunger $m'$ and over to the further side of the trough. The spring-plunger then pushes the card forward slightly in the trough, and the same operation is repeated upon the other side and by the opposite plunger. I I' show adjusting-screws for the vertical shafts, and to accurately keep the knives corresponding with the apices of the notches in the cards. J shows a channel in the trough into which to insert an instrument by which to remove cards cut by the operations before described. As before described the cards, when thus removed, are stacked alternately as to the direction of their butts and points, and with the points projecting, as seen at Fig. 11.

When placed in the rack for dipping it will be perceived that they need no slats to separate them, but each card serves this purpose with the next one, keeping themselves separated by their own thickness. Thus the dipper when he has dipped the points projecting from one side of the rack has only to reverse the rack and perform the same operation with those projecting from the other side.

Instead of the shaft $g$, motion may be communicated directly to the shaft $k$, and from this shaft transferred to the shaft $t$, in order to impart the desired motions in proper succession and order to the plungers $c$ $c'$ and the spring-plunger $m'$. This arrangement, it is evident, would dispense with the main shaft $g$.

From the spring-plunger $m'$ arms may be extended to operate upon card-blanks by means of properly shaped cutters in such manner as to notch the cards just previous to their being forced upon the slitting-knives $d$ $d'$. The motion of the plunger $m'$ furnishes the proper motion and in proper time for the said operation. These arms may operate upon the said card-blanks as they pass the inner walls of the hoppers, or at any other convenient point, either before or after the cards are slit.

By this attachment the expense of a separate notching-machine may be avoided, and square card-blanks fed into the hoppers and notched by the same operation in which they are slit, or in the same machine, thus insuring more perfectly the coincidence of the notches with the slits.

Instead of the devices or cams on the shaft $t$, and the projections on the two vertical shafts for the purpose of properly moving the knives $d$ $d'$, the knives can be moved by projections attached to the sash $e$. In either case, if desired, only one set or vertical row of knives may be used instead of four, as shown. When this is done, when either of the two plungers $c$ or $c'$ has pushed the card so that it will be cut a sufficient proportion of its length, then the before-mentioned devices on the sash may be so arranged as to strike the heads upon which the knives are set so as to turn them in such manner that the card will then pass into the stacking-trough without having the slit extended any further portion of its length. The return or reciprocating motion of the sash will then reset the same knives so as to cut the next card when driven on to them by the next motion of the plunger; or the before-mentioned devices on the vertical shafts $u$ $w'$ and shaft $t$ may be so adjusted as to accomplish the same result.

If thought necessary guides to meet the notches of the cards, and to correspond exactly in position with the position of the slitting-knives, may be arranged so as to insure the slitting-knives entering precisely the points of the notches. Instead of the rotary motion applied to these knives, as described, a set or sets of knives can be simply forced backward by means of a wedge or inclined plane when a card has been cut a sufficient part of its length. In this case the knife-blocks would move in slides or grooves at right angles to the direction of the motion of the sash $e$. The wedge or inclined plane could be operated by, or attached to, the sash. The knife-block could be returned so as to place the knives in a position for cutting the next card by the return movement of the sash $e$.

K shows a guide, having small projecting points L which slightly penetrate the top edge of the cards when they are pushed forward in the stacking-trough by the spring-plunger $m'$. Corresponding points may project upward from the bottom of the trough. These will take and hold the last card pushed forward by the plunger $m'$ and prevent its being pushed back to the opposite side of the trough by the passage of the next card behind it, and insure the points of the cards remaining pressed against the sides of the trough $b$.

It will be observed that our invention contemplates the successive action of the upright rows of knives, so that one may have time to cool, after cutting a card, while another is employed in cutting.

It is plain that the slitting-knives may have at a certain point on their peripheries a notching-tool to notch a card. This can be made by notching the slitting-knife, where it first meets the card as it is forced in by a plunger, with two edges, so that these two edges shall form a V-shaped cutter, V, and thus cut through the card and make the notch; and then the single blade will be brought against the card and make the slit. (See Figs. 10, 12.) Thus a card can be both notched and cut by the knives hereinbefore described, when thus modified.

The object of notching match-cards is to prevent the points being united by the composition used in dipping them. The expense of notching can be saved by having the cards spread apart at their points instead of being pointed or notched. This can be easily done by guides on the sides of the stacking-trough, the same to correspond with the slits made by the slitting-knives.

What we claim as our invention, and desire to secure by Letters Patent, is—

1. The combination of the hoppers $a\ a'$, plungers $c\ c'$ in the sash $e$, with the spring-plunger $m'$, as herein set forth.

2. The combination of the knives $d\ d'$, plungers $c\ c'$, spring-plunger $m'$, and the trough $b$, as herein set forth.

3. The slotted hoppers $a\ a'$ in combination with the carriages D, levers C, tracks E, fingers B, to operate as and for the purpose herein described.

4. The method of slitting match-cards and stacking them in positions ready for dipping at one and the same operation, and in one and the same machine, as herein set forth.

5. The combination of the slotted hoppers $a\ a'$ with the feeding-devices herein described, plungers $c\ c'$, knives $d\ d'$, spring-plunger $m'$, and trough $b$, as herein set forth.

6. The combination of the gear $n$ on the main shaft $g$ with the gear $o$ on the shaft $p$, pinion $r$, bevel-gear $s$ on the shaft $t$, cam $u$, and projections $v$ on the vertical shafts $w\ w'$, as and for the purpose herein set forth.

7. The combination of the gear $n$, the main shaft $g$, with the gear $o$ on the shaft $p$, pinion $r$, bevel-gear $s$ on the shaft $t$, with the cam $z$, and projections $v$ on the vertical shaft $w\ w'$, as and for the purposes herein set forth.

8. The combination of the gear $n$ on the main shaft $g$ with the gear $o$ on the shaft $p$, pinion $r$, bevel-gear $s$ on the shaft $t$, cam or projection $y$, and the projections $v$, and the spring $g'$, as and for the purposes herein set forth.

9. The combination of the spring-plunger $m$, the stud $x$, the lever $q'$, cam $v'$ having the elevations $o'\ p'$, and all as herein specified.

10. The guide K, with its points L, in combination with the stacking-trough $m'$, as and for the purpose herein set forth.

In testimony that we claim the foregoing we have hereunto set our hands this 11th day of March, 1873.

PERLEY D. CUMMINGS.
    MANASSEH SMITH.
    JAMES C. JORDAN.

Witnesses:
 WM. HENRY CLIFFORD,
 FRANK H. JORDAN.